Patented Jan. 9, 1951

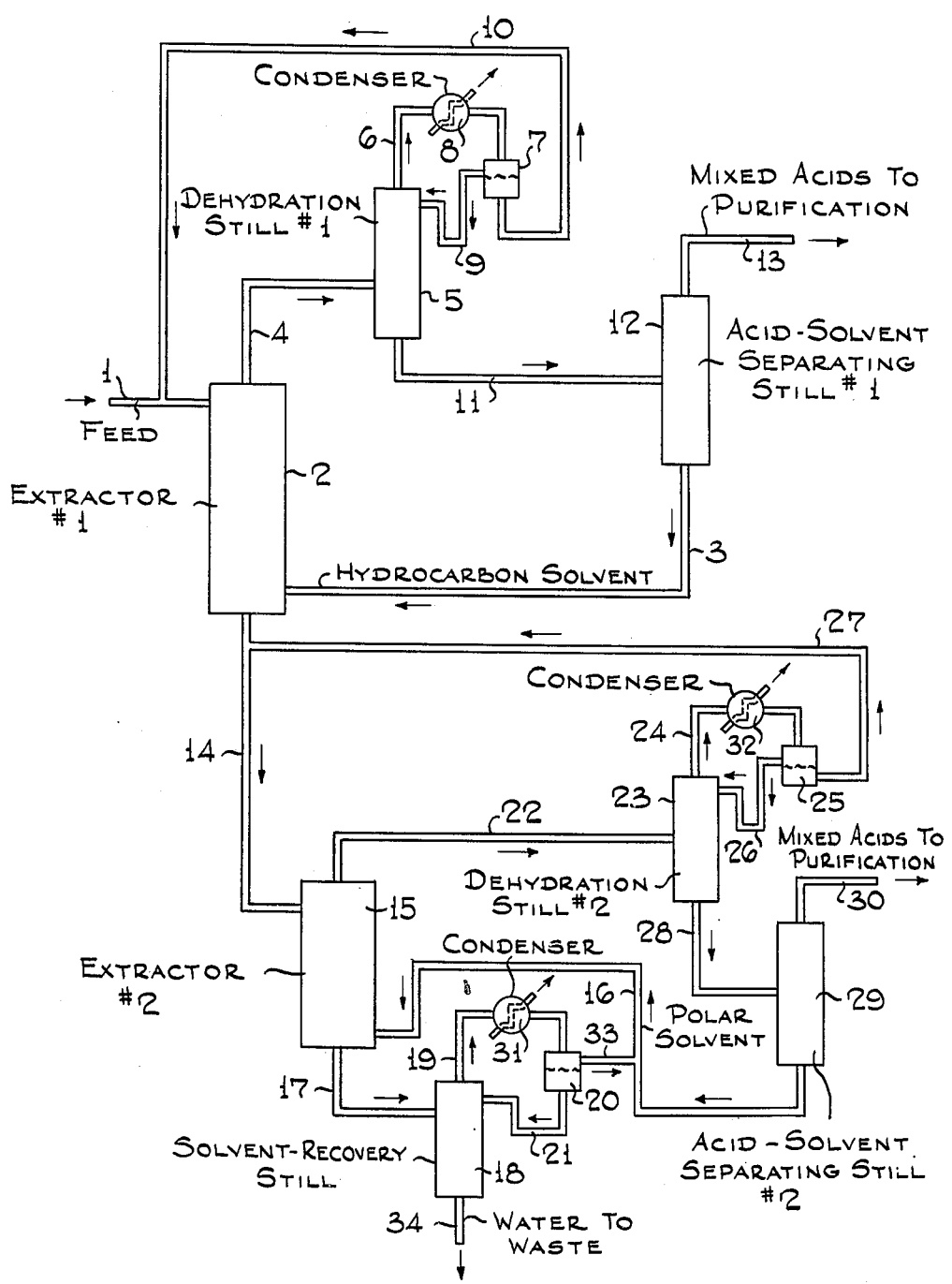

2,537,658

UNITED STATES PATENT OFFICE 2,537,658

RECOVERY OF FATTY ACIDS FROM DILUTE AQUEOUS SOLUTIONS

Ralph W. Dornte, Hatboro, Pa., assignor to Standard Oil Development Company, a corporation of Delaware Application August 16, 1948, Serial No. 44,454

2 Claims. (Cl. 260—450)

This invention relates to an improved process for extracting and dehydrating fatty acids as found in low concentrations in aqueous solutions. More particularly, it relates to an efficient commercially feasible process for the extraction and purification of a mixture of fatty acids as found in low concentrations in the aqueous layer resulting from hydrocarbon synthesis reactions.

Hydrocarbon synthesis reactions are performed by contacting hydrogen, and oxides of carbon with catalysts under various temperature and pressure conditions. The temperatures employed vary widely, as for example, in the range from about 400° F. to about 800° F. and are generally in the range from 500° to about 700° F. The particular temperature employed depends upon, among other factors, the type of non-gaseous hydrocarbon product desired, the character and the activity of the particular catalyst utilized, the throughput and composition of the synthetic gases and upon the reaction pressure. The pressures, likewise, vary considerably and are a function of other operative conditions such as catalyst employed, activity of the catalyst, character of the feed gases and the temperatures utilized. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The proportion of the type products obtained thus vary with the conditions. In all cases, however, gaseous products removed overhead from the reaction zone are condensed and segregated into an oil phase and an aqueous phase.

The oxygenated compounds produced during hydrocarbon synthesis are distributed between the oil and water phases in an amount which is a function of the relative volume of product oil and water and the molecular weight and type of the oxygenated compounds produced. The latter factor is involved in the distribution of the oxygenated compounds in the two phases. In normal operations, the ratio of water produced to oil produced may vary over the range from about 0.8 to 3.0 volumes of water per volume of oil, depending upon the operating conditions and the catalyst employed during the synthesis. Accordingly, there is a wide variation in the proportion of the total oxygenated compounds existing in the water phase; and this extends over the range from about 10 to 40 weight percent.

The oxygenated compounds found in the water layer comprise the neutral compounds including alcohols, aldehydes, ketones and esters, and fatty acids.

The neutral oxygenated compounds are recovered from the water layer by distillation carried on below 100° C. The neutral compounds and their azeotropes are thus stripped off first, leaving substantially only the fatty acids in the water. The stripped aqueous layer or acid water bottoms from most synthesis runs contains the $C_2$–$C_6$ aliphatic acids in a total concentration equivalent to about 2 to 5 weight per cent or acetic acid, often nearer the lower figure. It is desirable to recover these acids in marketable purities and substantially quantitatively from the water, since their disposal as polution waste is not practical and any chemical disposal involves expense in the hydrocarbon synthesis process. In addition, these organic acids represent valuable chemical raw materials for industry.

Economic recovery of acids in such low concentrations is quite difficult to achieve by conventional distillation methods because of the prohibitive heat requirements and equipment sizes necessitated by the very dilute feeds. Difficulties are encountered in extraction processes when a single extractive solvent is used due to the azeotroping of the solvent with the acids present. This is especially true of the higher boiling, i. e. $C_4$ to $C_6$ acids, when polar organic high boiling extractants are used. The consequent difficulty in separation of the $C_4$ to $C_6$ acids from the polar solvent necessitates maintaining the latter at high temperatures for protracted time intervals. This also contributes to solvent losses by decomposition or polymerization reactions.

It has now been found that a two-stage solvent extraction process employing a high boiling hydrocarbon to extract the $C_4$ through $C_6$ acids in the first stage and a high boiling polar organic solvent to remove the remaining lower acids in the second stage is ideally adapted to overcome the before-mentioned difficulties.

The liquid hydrocarbons, used in the first stage as stated above, selectively extract the $C_4$ through $C_6$ acids. The term, high boiling hydrocarbon therefore, is relative to the $C_6$ acids. It is to be understood that wherever the term, high boiling hydrocarbons, is hereafter used, that it connotes normally liquid hydrocarbons boiling over 205° C. which are immiscible in water and have good capacities for the acids extracted. Among such hydrocarbons are: sym. triethyl benzene, B. P. 216° C.; naphthalene, B. P. 218° C.; methyl naphthalene, B. P. 245° C.; diphenyl, B. P. 256° C.; diphenyl methane, B. P. 266° C.; acenaphthene, B. P. 278° C.; dibenzyl, B. P. 284° C.; tetrahydronaphthalene, B. P. 207° C.; hexahydronaphthalene, B. P. 206° C.

The high boiling polar organic solvents can then be used to extract the lower fatty acids such as acetic and propionic from the raffinate of the first extraction. It is to be understood that whenever the term, high boiling polar organic solvent, is used hereafter that it connotes normally liquid organic compounds having at most limited solubility in water, good capacities for acetic and propionic acids, and which have boiling points of 160° C. or higher. Among such polar solvents are: methyl cyclohexanone, B. P. 165° C.; furfural, B. P. 162° C.; isophorone, B. P. 215° C. and the cresols.

The general term, mixture of fatty acids, is hereafter used to indicate a mixture of up to and including the $C_6$ acids.

This invention will be better understood by reference to the accompanying flow diagram.

In the system shown, the aqueous acid feed containing the mixture of fatty acids is fed through line 1 to the upper part of the first stage extractor 2 and the high boiling hydrocarbon extractant is supplied through line 3 to the lower part of the extractor 2 in which a counter-current flow of aqueous acid liquid and extractant occurs to enable the hydrocarbon extractant to remove the $C_4$ and higher acids. The acid-enriched extractant leaves the extractor 2 through line 4 and enters dehydration still 5 where water is removed by distillation from the extract. Some acid and hydrocarbon are removed with the water taken off overhead through line 6 and condenser 8 to decanter 7. The organic layer which separates from the water in the decanter is returned to still 5 by line 9 or reflux, and the water layer with acid is returned to extractor 2 through line 10. The acid-enriched water-free extractant leaves still 5 through line 11 and goes to acid-solvent separating still 12. The vaporized acids are taken off overhead through line 13 and purified by fractionation elsewhere. The hydrocarbon extractant left as residue in still 12 is returned to extractor 2 through line 3. Fresh make up hydrocarbon oil may be added as needed.

The aqueous raffinate containing $C_2$ and $C_3$ acids, with the $C_4$ through $C_6$ acids removed, is discharged from extractor 2 through line 14 to a second extractor 15. The preferred polar organic compound used as the extractant is isophorone. The raffinate is fed to the top of the extractor 15 at about 170° C. and the isophorone enters near the bottom at about 196° C. through line 16. The extracted or spent water layer, at about 168° C., passes to a solvent recovery still 18 through line 17. The isophorone water azeotrope (B. P. 94° C. at 1 atm. 12.6% isophorone) is then taken overhead through line 19 and condenser 31 to decanter 20 where it separates into two layers. The water layer is returned through line 21 as reflux to the solvent recovery still and the isophorone layer is sent to the recycled isophorone stream by line 33.

The acid-enriched polar organic extractant leaves the extractor 15 through line 22 to dehydration still 23. Th isophorone water azeotrope is taken overhead from still 23 through line 24 and condenser 32 to decanter 25. The isophorone layer is returned as reflux through line 26 and the water layer is returned through line 27 to extractor 15 to recover entrained acid. The acid-enriched water-free extractant leaves still 23 through line 28 to acid-from-solvent separating still 29. The acids are taken off overhead through line 30 and purified by fractionation elsewhere. The isophorone is returned to extractor 15 through line 16.

The operational temperatures on this two-stage consecutive extraction process are dependent upon a large number of engineering details such as: (1) the temperature of the feed, (2) the utilization of heat exchangers, (3) operational pressures which may range from 100 mm. to 30 p. s. i. g. In the main, the temperatures and pressures for this process may lie within the limits of 25 to 250° C. for temperature and 100 mm. to 30 p. s. i. g. for pressure. The foundamental principle of the process; namely, the extraction of the higher boi"ng acids with a high-boiling hydrocarbon solvent and the subsequent extraction of acetic and propionic acids with a high-boiling polar solvent is unaffected by these variations. This separation of the acids in two stages can be accomplished readily within the temperature and pressure ranges indicated.

The extractive powers of some of the preferred solvents are given in the tables that follow.

The acid distribution constant or acid capacity factor ($K_1$) of the solvent for acetic acid is the ratio of the acid concentrations (weight per cent) in the solvent phase and in the water phase at equilibrium. The capacity factor primarily determines the ratio of solvent to feed in the extractor and also the size and number of plates in the extractor. It is desirable for the extracting solvent to have a high capacity factor to minimize the solvent circulation and hence the size of the recovery plant. For the extraction of acetic acid from water, a solvent possessing a capacity factor equal to or greater than 1 is desirable.

The distribution constant ($K_2$) for water is the ratio of the water concentration (weight per cent) in the solvent phase to that in the aqueous phase at equilibrium. The selectivity beta of the solvent measures the sharpness of separation between water and acetic acid which can be accomplished in the extraction process. The selectivity is the ratio of the acid distribution constant to the water distribution constant.

$$\left(\text{Beta}=\frac{K_1}{K_2}\right)$$

TABLE I

*Distribution equilibrium of the fatty acids between water and hydrocarbon extractant, tetrahydronaphthalene*

| Solvent | Temp., °C. | Organic Layer | | Aqueous Layer, Acid Weight, Per Cent | $K_1$ | $K_2$ | Beta |
|---|---|---|---|---|---|---|---|
| | | Acid, Weight Per Cent | $H_2O$, Weight Per Cent | | | | |
| Tetrahydronaphthalene, B. P. 207° C. | 25 | $CH_3COOH$ .006 | 1.76 | $CH_3COOH$ .61 | .0099 | .0177 | .55 |
| | 75 | .003 | 1.80 | .60 | .0055 | .0191 | .30 |
| | 25 | $C_2H_5COOH$ .005 | 1.01 | $C_2H_5COOH$ .68 | .0074 | .0102 | .72 |
| | 75 | .010 | 1.09 | .66 | .015 | .0110 | 1.4 |
| | 25 | $C_3H_7COOH$ .28 | 1.48 | $C_3H_7COOH$ .60 | .47 | .0149 | .32 |
| | 75 | .28 | 1.32 | .58 | .48 | .0133 | .36 |
| | 25 | $C_4H_9COOH$ .75 | 1.11 | $C_4H_9COOH$ .27 | 2.78 | .0111 | .250 |
| | 75 | .72 | .96 | .31 | 2.32 | .0096 | .242 |
| | 25 | $i-C_5H_{11}COOH$ .97 | 1.19 | $i-C_5H_{11}COOH$ .11 | 8.81 | .0119 | .740 |
| | 75 | .93 | 1.33 | .13 | 7.15 | .0133 | .537 |

$K_1 = \dfrac{CH_3COOH \text{ weight per cent in organic layer}}{CH_3COOH \text{ weight per cent in aqueous layer}}$ $K_2 = \dfrac{H_2O \text{ weight per cent in organic layer}}{H_2O \text{ weight per cent in aqueous layer}}$ Beta $= K_1/K_2$

TABLE II

*Equilibrium distribution of fatty acids between water and solvent*

| Solvent | Temp., °C. | Organic Layer | | Aqueous Layer | | $K_1$ | $K_2$ | Beta |
|---|---|---|---|---|---|---|---|---|
| | | Acid, Weight Per Cent | $H_2O$, Weight Per Cent | Acid, Weight Per Cent | Solvent, Weight Per Cent | | | |
| Isophorone, B. P. 215° C. | 25 | $CH_3COOH$ 1.09 | 4.25 | $CH_3COOH$ .86 | 1.10 | 1.27 | .043 | 30 |
| | 75 | 1.06 | 6.15 | .96 | .97 | 1.10 | .063 | 18 |
| | 125 | 1.15 | 7.55 | 1.13 | | 1.02 | .083 | 12 |
| | 25 | $C_3H_7COOH$ 2.26 | 3.79 | $C_3H_7COOH$ .18 | 1.24 | 1.6 | .039 | 323 |
| | 75 | 2.26 | 3.54 | .23 | .83 | 9.8 | .035 | 280 |
| | 125 | 1.07 | 6.52 | .14 | .86 | 7.65 | .066 | 116 |
| o-Cresol, B. P. 191.5° C. | 25 | $CH_3COOH$ .92 | 12.07 | $CH_3COOH$ 1.09 | 1.04 | .84 | .123 | 6.8 |
| | 75 | .92 | 15.27 | 1.06 | 3.13 | .85 | .16 | 5.3 |
| | 25 | $C_3H_7COOH$ 1.82 | 9.26 | $C_3H_7COOH$ .30 | 1.48 | 6.08 | .93 | 65 |
| | 75 | 1.81 | 9.73 | .29 | 3.13 | 6.25 | .101 | 63 |

$K_1 = \dfrac{CH_3COOH \text{ weight per cent in organic layer}}{CH_3COOH \text{ weight per cent in aqueous layer}}$ $K_2 = \dfrac{H_2O \text{ weight per cent in organic layer}}{H_2O \text{ weight per cent in aqueous layer}}$ Beta $= K_1/K_2$ The hydrocarbon solvent extracts only small amounts of the $C_2$ and $C_3$ fatty acids, but the extractor can be designed to remove all of the higher-acids. The distribution constant ($K_1$) of tetrahydronaphthalene for acetic acid at 25° C. is only 0.0099, whereas the constant for valeric acid is 2.78 so that for equal concentrations of these acids in the aqueous layer, the hydrocarbon would extract roughly 200 times as much of valeric as acetic acids. The detailed equilibrium distribution results for tetrahydronaphthalene and decahydronaphthalene with the aqueous fatty acids are given in Table I. It should be noted that the acid distribution constant or capacity factor ($K_1$) of the hydrocarbon increases rapidly with the number of carbon atoms in the fatty acids and that the selectivity (beta) likewise increases in the same manner. These results are the fundamental quantities involved in the extractor design.

The process of this invention may be carried out in a standard apparatus for carrying out extractions with appropriate auxiliary stills and separator vessels and at elevated temperatures. Fresh extractant may be added as needed to the recycled and recovered extractant.

Among the advantages of the process of this invention is that the hold-up time and consequent solvent loss of the polar organic extractant is decreased. The undesirable build-up of the $C_4$ to $C_6$ acids is also decreased while the scope of recoverable products is extended.

As will be apparent from the foregoing, the present invention may be practiced with any of the above types of extractant solvents and with procedures other than those specifically described and under a variety of conditions of temperatures, pressures, or concentrations of materials. Such modifications are part of this invention and are intended to be included therein.

What is claimed:

1. A process for separating $C_4$ to $C_6$ fatty acids and $C_2$ to $C_3$ fatty acids from a dilute aqueous solution of said acid, which comprises first extracting the $C_4$–$C_6$ fatty acids from said solution with a high boiling liquid cyclic hydrocarbon extractant to essentially remove the $C_5$ and $C_6$ acids which tend to azeotrope with isophorone, said hydrocarbon extractant boiling above 205° C. and essentially higher than the $C_5$ and $C_6$ acids, removing the hydrocarbon extractant containing the extracted $C_4$–$C_6$ acids from the residual aqueous solution containing the $C_2$ and $C_3$ acids, then extracting the $C_2$ and $C_3$ with isophorone from the residual aqueous solution which is freed of the $C_5$ and $C_6$ acids, and separately distilling the $C_2$ and $C_3$ acids from the isophorone extractant to obtain separate pure distillates of the $C_2$ and $C_3$ acids.

2. A process as described in claim 1, in which the cyclic hydrocarbon extractant is tetrahydronaphthalene.

RALPH W. DORNTE.

REFERENCES CITED

The following references are of record in the file of this patent:

UNITED STATES PATENTS

| Number | Name | Date |
|---|---|---|
| 1,917,660 | Martin et al. | July 11, 1933 |
| 2,255,235 | Wentworth | Sept. 9, 1941 |
| 2,275,862 | Othmer | Mar. 10, 1942 |
| 2,395,010 | Othmer | Feb. 19, 1946 |